US010961934B2

(12) United States Patent
Jin et al.

(10) Patent No.: US 10,961,934 B2
(45) Date of Patent: Mar. 30, 2021

(54) METHOD FOR CONTROLLING ENGINE COMBUSTION FOR REDUCING IRREGULAR VIBRATION CAUSED BY UNSTABLE ENGINE COMBUSTION

(71) Applicants: Hyundai Motor Company, Seoul (KR); Kia Motors Corporation, Seoul (KR); Seoul National University R&DB Foundation, Seoul (KR)

(72) Inventors: Jae-Min Jin, Seoul (KR); Seung-Hyun Lee, Suwon-Si (KR); In-Soo Jung, Suwon-Si (KR); Kyoung-Doug Min, Seoul (KR); Yong-Joo Lee, Daegu (KR); Seung-Il Lee, Seoul (KR)

(73) Assignees: Hyundai Motor Company, Seoul (KR); Kia Motors Corporation, Seoul (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/678,913

(22) Filed: Nov. 8, 2019

(65) Prior Publication Data
US 2020/0182184 A1 Jun. 11, 2020

(30) Foreign Application Priority Data
Dec. 11, 2018 (KR) .......................... 10-2018-0159363

(51) Int. Cl.
*F02D 41/14* (2006.01)
*F02D 41/00* (2006.01)
(Continued)

(52) U.S. Cl.
CPC ....... *F02D 41/1498* (2013.01); *F02D 41/009* (2013.01); *F02D 41/0085* (2013.01);
(Continued)

(58) Field of Classification Search
None
See application file for complete search history.

(56) References Cited

U.S. PATENT DOCUMENTS 5,345,911 A * 9/1994 Kadowaki ........... F02D 41/1498
123/436
6,112,149 A * 8/2000 Varady .................... F02B 75/22
123/406.24
(Continued)

FOREIGN PATENT DOCUMENTS

JP H08-61198 A 3/1996
JP 2013-185549 A 9/2013
(Continued)

*Primary Examiner* — Kevin R Steckbauer
(74) *Attorney, Agent, or Firm* — Morgan, Lewis & Bockius LLP

(57) ABSTRACT

A method for controlling engine combustion may include receiving a signal of a crank position sensor, determining an angular velocity and an angular acceleration of a crank on the basis of the signal of the crank position sensor, determining a combustion characteristic index for each cylinder using the angular velocity and the angular acceleration of the crank, judging an unstable combustion cylinder using the combustion characteristic index for each cylinder, and changing a combustion factor for controlling the unstable combustion cylinder.

6 Claims, 8 Drawing Sheets

(51) Int. Cl.
*G01P 15/00* (2006.01)
*G01P 3/44* (2006.01)
*F02P 5/04* (2006.01)
*F02D 35/02* (2006.01)

(52) U.S. Cl.
CPC ............... *F02P 5/045* (2013.01); *G01P 3/44* (2013.01); *G01P 15/00* (2013.01); *F02D 35/02* (2013.01); *F02D 41/008* (2013.01); *F02D 2200/101* (2013.01); *F02D 2200/1012* (2013.01)

(56) References Cited

U.S. PATENT DOCUMENTS

| | | | | |
|---|---|---|---|---|
| 6,212,945 | B1 * | 4/2001 | Moskwa | G01M 15/11 |
| | | | | 701/111 |
| 6,411,886 | B1 * | 6/2002 | Morra | G01L 23/225 |
| | | | | 701/111 |
| 6,412,469 | B1 * | 7/2002 | Itoyama | F02D 41/403 |
| | | | | 123/299 |
| 6,751,543 | B2 * | 6/2004 | Gras | F02P 5/151 |
| | | | | 701/103 |
| 7,623,955 | B1 * | 11/2009 | Rackmil | F02D 41/0097 |
| | | | | 123/435 |
| 7,747,380 | B2 * | 6/2010 | Chauvin | G01M 15/12 |
| | | | | 701/111 |
| 7,958,779 | B2 * | 6/2011 | Nagano | F02D 41/0097 |
| | | | | 73/114.25 |
| 8,346,460 | B2 * | 1/2013 | Okamoto | B60K 5/12 |
| | | | | 701/111 |
| 8,418,674 | B2 * | 4/2013 | Yasuhara | F02D 41/34 |
| | | | | 123/406.23 |
| 9,618,423 | B2 * | 4/2017 | Choi | F02D 41/0097 |
| 2002/0072844 | A1 * | 6/2002 | Gras | F02D 41/22 |
| | | | | 701/103 |
| 2003/0030203 | A1 | 2/2003 | Nemoto | |
| 2005/0017420 | A1 | 1/2005 | Nemoto et al. | |
| 2006/0021596 | A1 * | 2/2006 | Maeda | F02D 37/02 |
| | | | | 123/406.26 |
| 2008/0126044 | A1 * | 5/2008 | Degaki | F02D 41/26 |
| | | | | 703/8 |
| 2009/0030593 | A1 * | 1/2009 | Chauvin | G01M 15/12 |
| | | | | 701/111 |
| 2009/0276143 | A1 * | 11/2009 | Rackmil | F02D 41/0097 |
| | | | | 701/103 |
| 2009/0282903 | A1 * | 11/2009 | Nagano | F02D 41/0097 |
| | | | | 73/114.15 |
| 2010/0224168 | A1 * | 9/2010 | Yasuhara | F02D 35/028 |
| | | | | 123/406.23 |
| 2010/0250104 | A1 * | 9/2010 | Okamoto | F16F 15/02 |
| | | | | 701/111 |
| 2012/0310513 | A1 * | 12/2012 | Chauvin | F02B 77/085 |
| | | | | 701/111 |
| 2016/0299035 | A1 * | 10/2016 | Choi | G01M 15/11 |
| 2016/0363061 | A1 * | 12/2016 | Waisanen | F02D 41/1498 |
| 2019/0376459 | A1 * | 12/2019 | Pieczko | F02D 13/0203 |

FOREIGN PATENT DOCUMENTS

| | | |
|---|---|---|
| KR | 10-1049093 B1 | 7/2011 |
| KR | 10-1294078 B1 | 8/2013 |

* cited by examiner

METHOD FOR CONTROLLING ENGINE COMBUSTION FOR REDUCING IRREGULAR VIBRATION CAUSED BY UNSTABLE ENGINE COMBUSTION

CROSS-REFERENCE(S) TO RELATED APPLICATIONS

The present application claims priority to Korean Patent Application No. 10-2018-0159363, filed on Dec. 11, 2018, the entire contents of which is incorporated herein for all purposes by this reference.

BACKGROUND OF THE DISCLOSURE

Field of the Disclosure

The present invention relates to a method for controlling engine combustion for reducing irregular vibration generated when a vehicle is being driven.

Description of Related Art

If irregular incomplete combustion occurs in an engine when a vehicle is driven, vibration spreads over the vehicle to reduce the comfort of driving and hinder safe driving.

However, there is no technology for detecting such irregular vibration of the vehicle and controlling the engine.

Currently, in an engine management system for controlling combustion of an engine, an engine roughness (ER) index is used to judge irregular vibration. In actual vehicles, however, the ER index is not highly not correlated with irregular vibration generated in the vehicle, and accordingly, proper engine combustion control is not achieved.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling engine combustion, in which an index by which irregular vibration of a vehicle may be judged is defined and combustion factors of a specific cylinder, that generates irregular vibration, is controlled using the defined index, reducing the irregular vibration caused by unstable engine combustion.

A method for controlling engine combustion according to various aspects of the present invention may include receiving a signal of a crank position sensor; determining an angular velocity and an angular acceleration of a crank on the basis of the signal of the crank position sensor; determining a combustion characteristic index (CCI) for each cylinder using the angular velocity and the angular acceleration of the crank; judging a unstable combustion cylinder using the combustion characteristic index for each cylinder; and changing a combustion factor for controlling the unstable combustion cylinder.

Here, the combustion characteristic index (CCI) may be determined by the follow equation.

$$CCI = \frac{\int \alpha d\theta}{(\bar{\omega})^2} = \frac{\text{Integral of CA reference of angular acceleration in combustion zone } \left[\frac{\text{rad}^2}{\text{sec}^2}\right]}{\text{Square of average angular velocity in combustion zone } \left[\frac{\text{rad}^2}{\text{sec}^2}\right]}$$

In determining the angular velocity and the angular acceleration of the crank, in addition, the angular velocity and the angular acceleration of the crank may be determined using the crank signal for a zone of TDC (top dead center; firing) ~TDC+60CA of the crank signal received in receiving the signal of the crank position sensor.

Furthermore, the method of the present invention may further include determining a standard deviation for the median of combustion characteristic index for each cylinder.

Here, the standard deviation for the median may be determined by the following equation.

$$\text{Deviation of Median} = \sqrt{\frac{1}{N}\sum_{i=1}^{4}(CCI._{cyli} - \text{median}(n.i._{cyli}))^2}$$

Furthermore, the method of the present invention may further include judging whether the standard deviation for the median is equal to or greater than a predetermined threshold value; and determining the cylinder having the combustion characteristic index as the unstable combustion cylinder when the standard deviation for the median is equal to or greater than the threshold value.

In changing the combustion factors for controlling the unstable combustion cylinder, according accordingly, ignition timing of the unstable combustion cylinder or fuel amount may be controlled and changed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
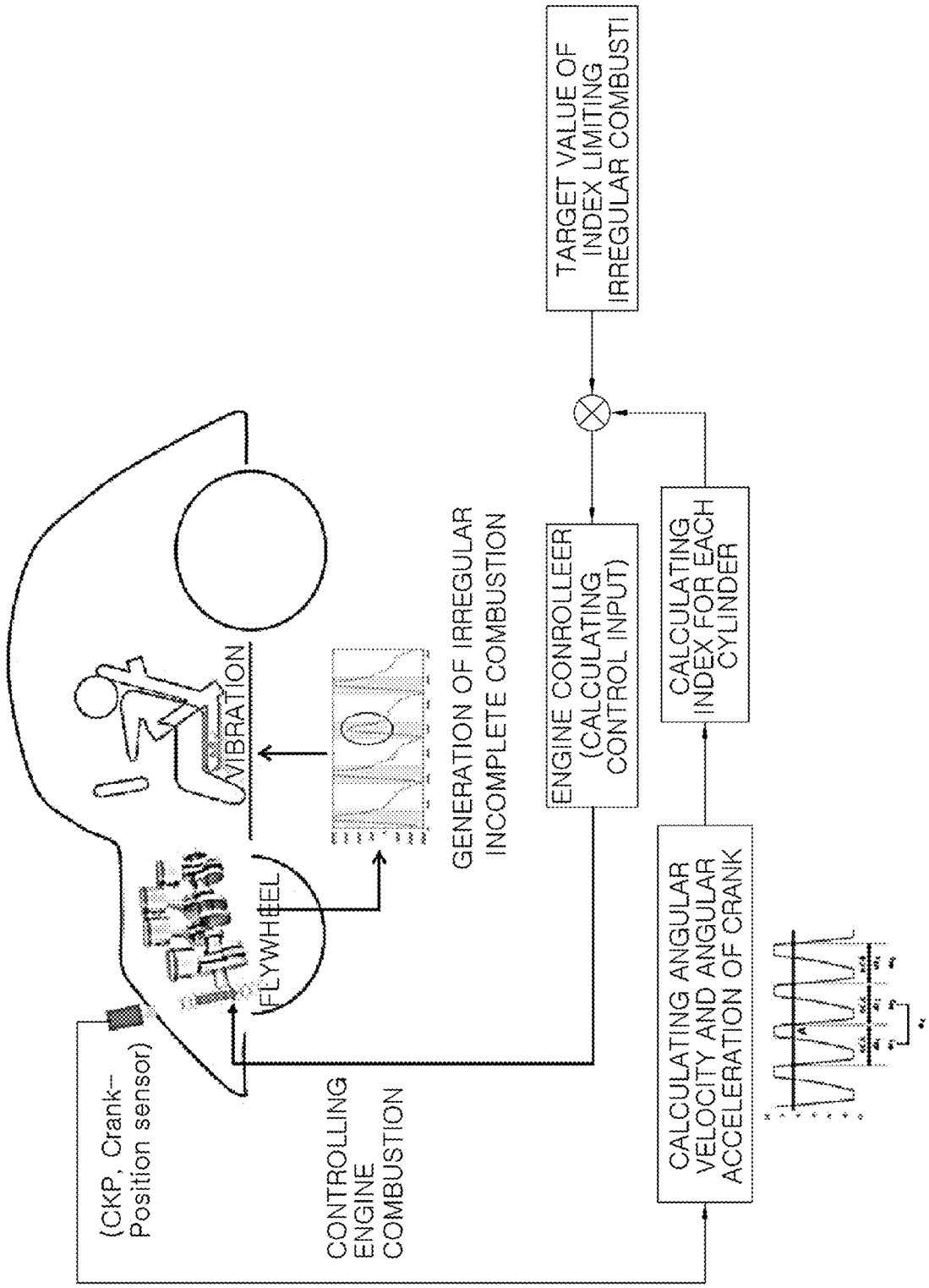
FIG. 1 illustrates a control concept of a method for controlling engine combustion according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To fully understand the present invention, operational advantages of the present invention, objects achieved by embodiments of the present invention, reference may be made to the accompanying drawings and contents illustrated in the accompanying drawings which illustrate the exemplary embodiments of the present invention.

In describing the exemplary embodiments of the present invention, well-known techniques or repetitive descriptions which may unnecessarily obscure the gist of the present invention will be reduced or omitted.

FIG. 1 illustrates a control concept of a method for controlling engine combustion according to an exemplary embodiment of the present invention.

Hereinafter, a method for controlling engine combustion according to an exemplary embodiment of the present invention is described with reference to FIG. 1.

A method for controlling engine combustion according to an exemplary embodiment of the present invention is a method configured for controlling a combustion factor for a relevant cylinder to reduce irregular vibration caused by unstable engine combustion, by defining a combustion characteristic index which can judge the engine combustion instability and by distinguishing the cylinder generating irregular vibration using the defined combustion characteristic index.

As shown in FIG. 1, control of the combustion in the engine performed by an engine management system (EMS) including a controller judges the combustion characteristic index for each cylinder according to a newly provided combustion characteristic index (CCI), rather than an existing judgement index and provides a target value of the combustion characteristic index for combustion control of the relevant cylinder to improve a deviation between the cylinders, so that an engine controller can perform control of the combustion such as ignition timing or the like.

The method for controlling engine combustion according to an exemplary embodiment of the present invention for the present purpose receives a signal of a crank position sensor to determine an angular velocity and an angular acceleration of a crank and determines the combustion characteristic index defined based on the angular velocity and the angular acceleration of the crank.

Furthermore, the method for controlling engine combustion distinguishes the unstable combustion cylinder based on the combustion characteristic index to control combustion factors of the relevant unstable combustion cylinder.

The above procedure is described in more detail with reference to FIGS. 2 to 5.

Figure 2:
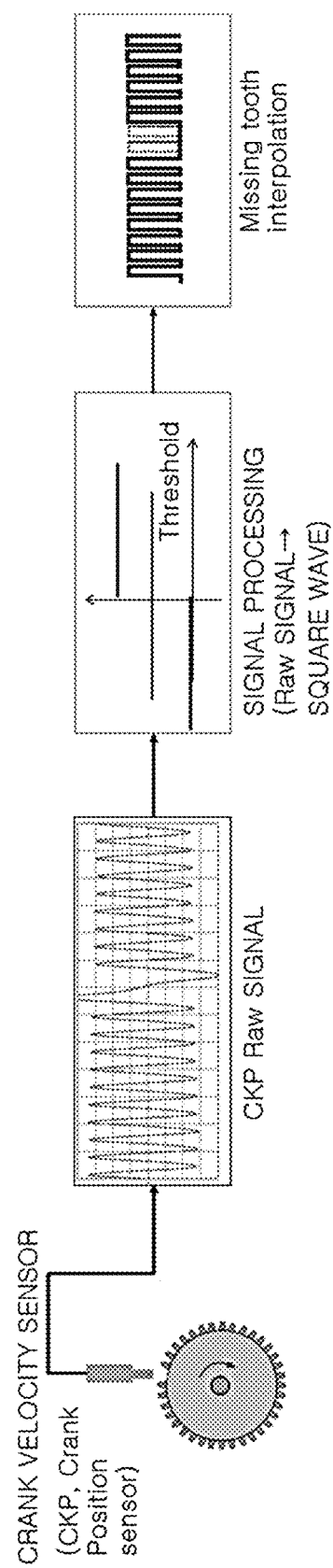
FIG. 2 schematically illustrates a signal conditioning process performed by the control method of the present invention.
Figure 3:
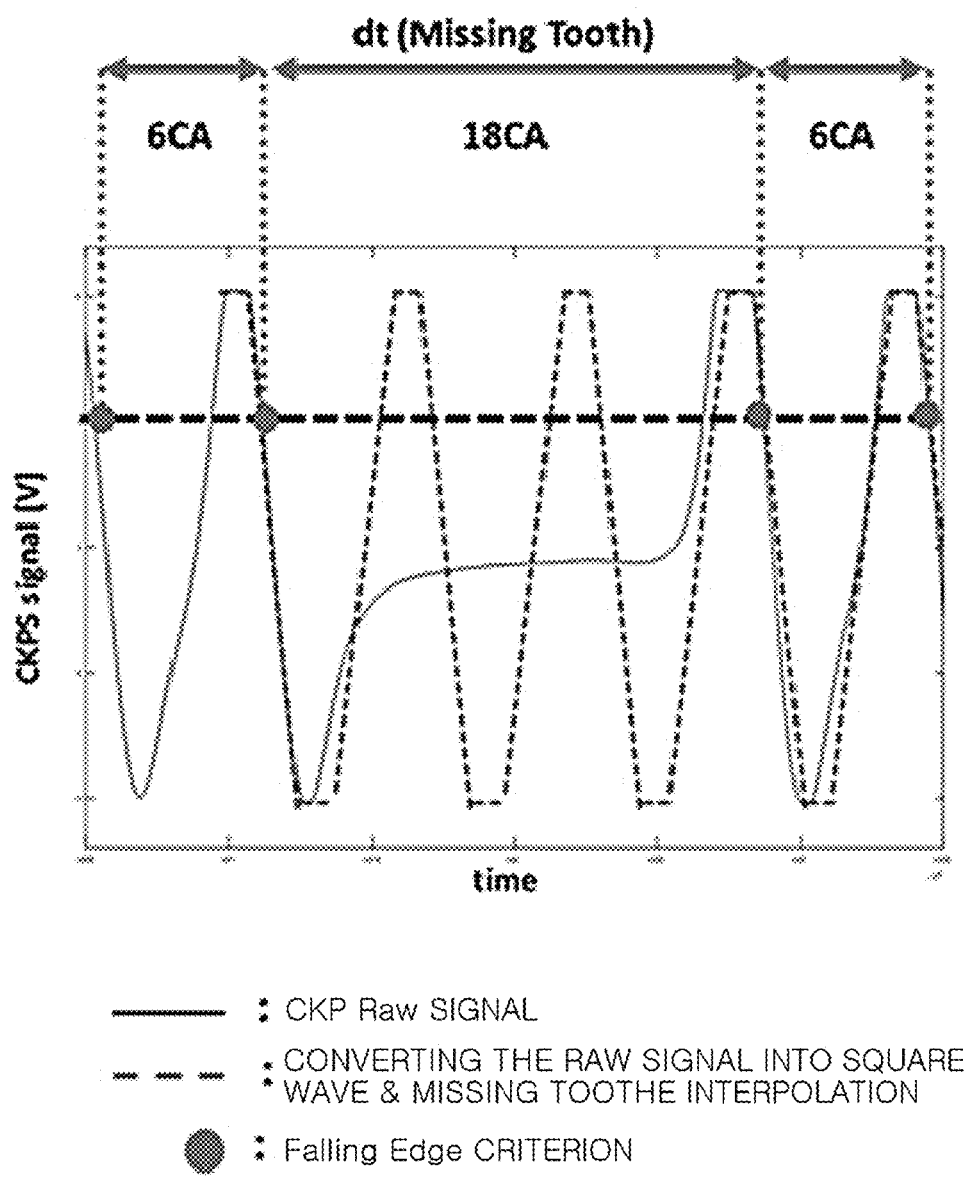
FIG. 3 is a view for explaining a signal processing performed by the control method of the present invention.
Figure 4:
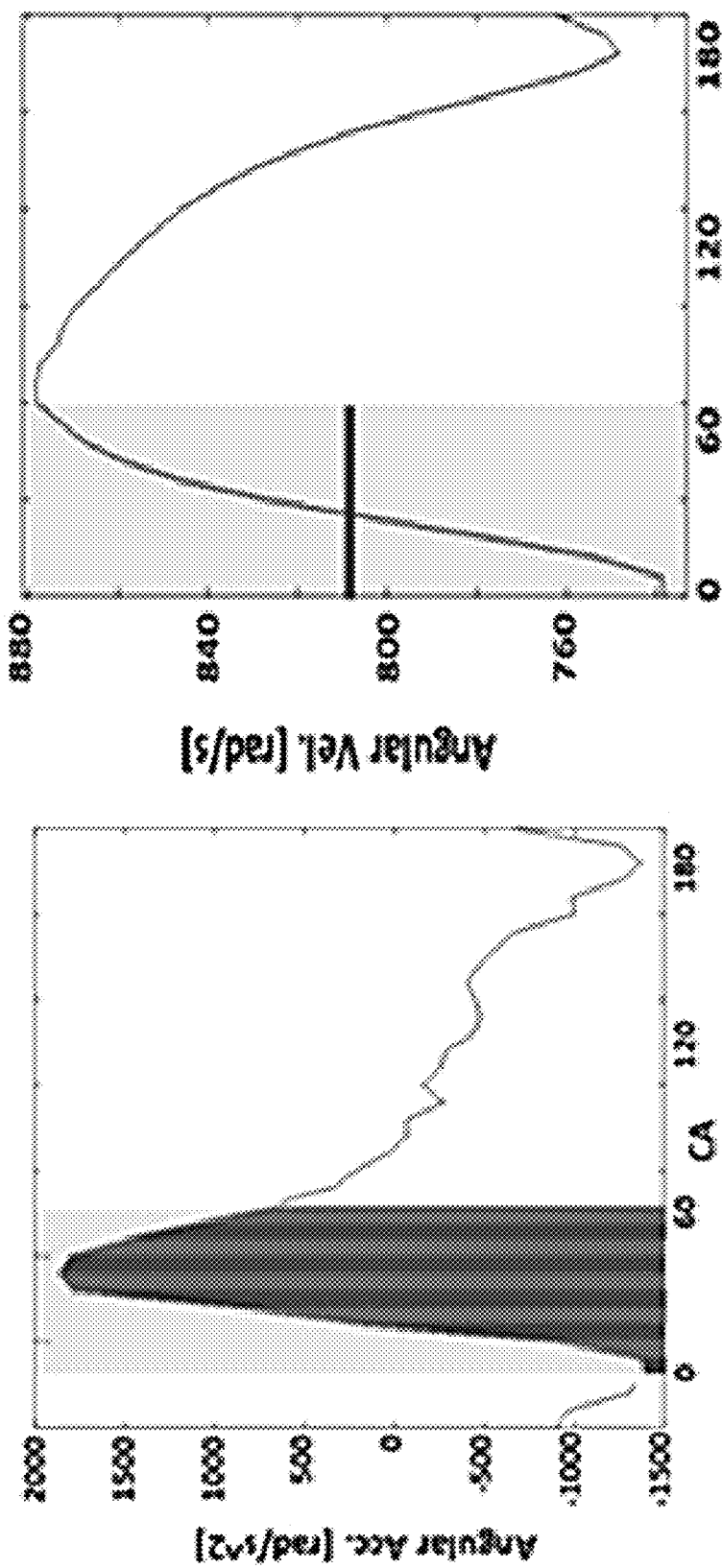
FIG. 4 is a view for explaining a determination of a combustion characteristic index (CCI) performed by the control method of the present invention.
Figure 5:
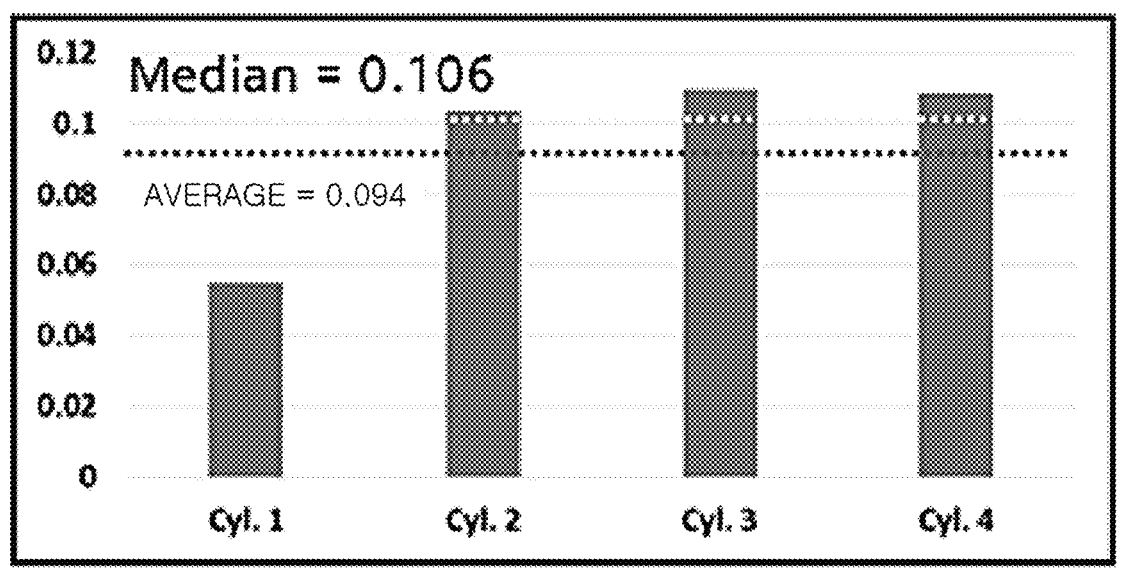
FIG. 5 is a view exemplarily illustrating an example of determination of a deviation between cylinders using a median of the CCI, performed by the control method of the present invention.

FIG. 2 schematically illustrates a signal conditioning process performed by the control method of the present invention, FIG. 3 is a view for explaining a signal processing performed by the control method of the present invention, FIG. 4 is a view for explaining a determination of the combustion characteristic index (CCI) performed by the control method of the present invention, and FIG. 5 is a view exemplarily illustrating an example of determination of a deviation between the cylinders using a median of the CCI, performed by the control method of the present invention.

A raw signal is received from the crank position sensor, and a signal conditioning process is performed for a measurement accuracy of the received signal.

In other words, the raw signal is converted into a square wave and the missing tooth interpolation is performed.

As shown in FIG. 3, the angular velocity and the angular acceleration of the crank are determined on the basis of the signal (60-2 teeth/rev) which is subjected to the signal conditioning process.

Based on the down edge, the angular velocity and the angular acceleration are determined as follows.

$$\text{Angular velocity } w_1 = \frac{6CA}{dt_1}$$

$$\text{Angular acceleration } \alpha_A = \frac{\omega_2 - \omega_1}{\frac{1}{2}(dt_1 + dt_2)}$$

As such, as shown in FIGS. 4A and 4B, the combustion characteristic index defined by non-dimensionalizing the angular acceleration of each cylinder in a combustion zone is determined.

That is, the combustion characteristic index (CCI) is defined as follow.

$$CCI = \frac{\int \alpha d\theta}{(\overline{\omega})^2} = \frac{\text{Integral of } CA \text{ reference of angular acceleration in combustion zone } \left[\frac{\text{rad}^2}{\text{sec}^2}\right]}{\text{Square of average angular velocity in combustion zone } \left[\frac{\text{rad}^2}{\text{sec}^2}\right]}$$

When the combustion characteristic index is determined as above, the unstable combustion cylinder is distinguished by use of the combustion characteristic index.

To distinguish the unstable combustion cylinder, the present invention utilizes the median of the combustion characteristic index to determine the deviation of each cylinder as shown in FIG. 5 and Table 1 below based on four-cylinder engine.

TABLE 1

| Combustion Characteristic Index (CCI) | | | |
|---|---|---|---|
| Cyl. 1 | Cyl. 2 | Cyl. 3 | Cyl. 4 |
| 0.055 | 0.103 | 0.110 | 0.109 |
| Standard deviation | | 0.0228 | |
| Deviation of median | | 0.0256 | |

The standard deviation of median is determined by the following equation.

$$\text{Deviation of Median} = \sqrt{\frac{1}{N}\sum_{i=1}^{4}(CCI._{cyli}-\text{median}(n.i._{cyli}))^2}$$

wherein N is the number of cylinders, CCI.cyli is combustion characteristic index of $i^{th}$ cylinder out of the N cylinders.

If the median determined as above is used, there is no influence on the value of the combustion characteristic index of the cylinder in which abnormal combustion is generated and it is more advantage to distinguish the problematic cylinder, and thus a criterion value for determining whether the combustion is abnormal is selected based on the deviation of the median.

In other words, when the standard deviation for the median of the combustion characteristic index is compared with the established criterion value and it is determined that the standard deviation of the median is greater than the criterion value, the cylinder in which the minimum combustion characteristic index is generated is judged as the unstable combustion cylinder.

In an exemplary embodiment of the present invention, when the unstable combustion cylinder is determined in the present way, the combustion stability of the cylinder is controlled to enable irregular vibration to be reduced.

That is, an index target value for controlling the combustion stability is set, and the ignition timing for improving the combustion stability according to the present difference is controlled.

To improve the deviation of injection flow rate of an injector which causes a generation of the deviation between the cylinders, in addition, the fuel injection amount is corrected to allow the deviation of the combustion characteristic index between the cylinders to be minimized.

Figure 6:
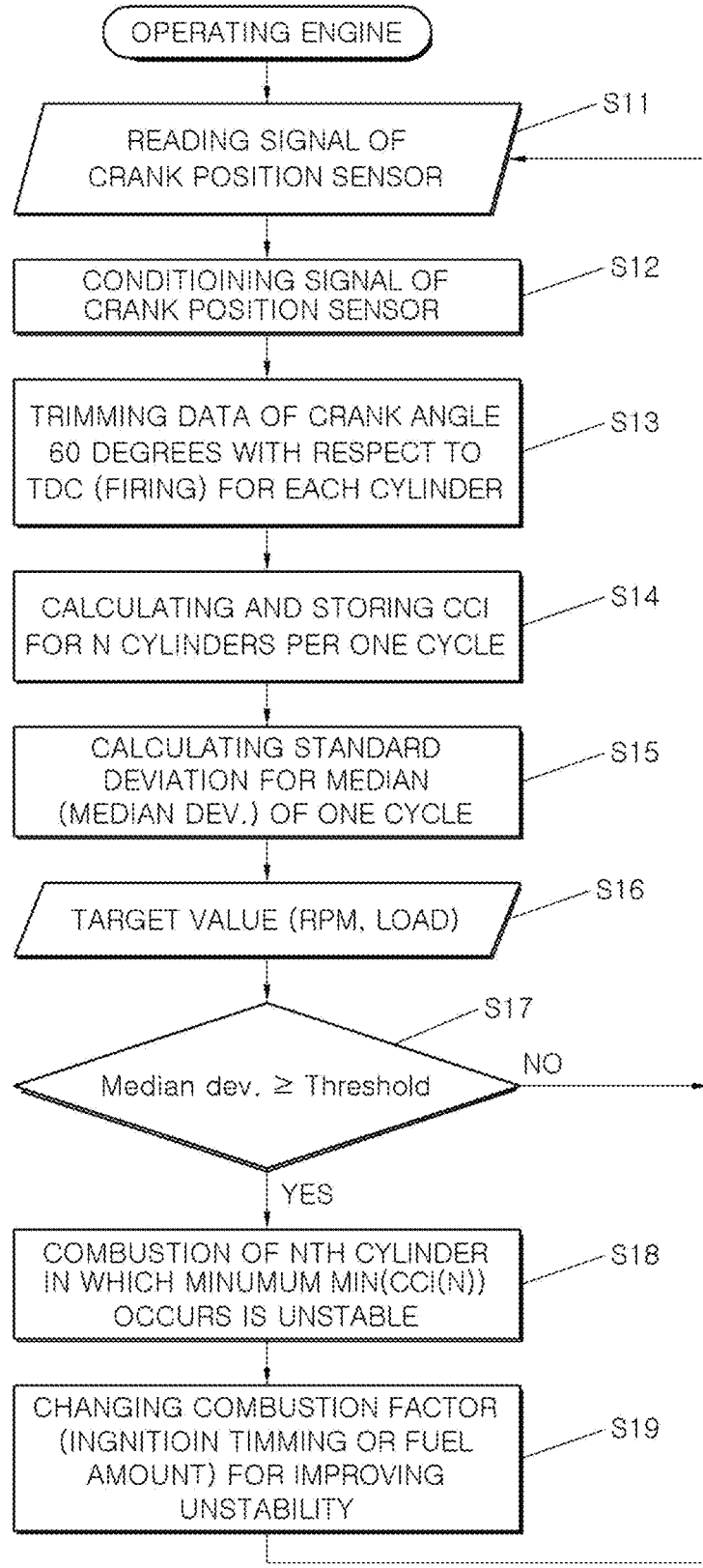
FIG. 6 is a view sequentially illustrating a method for controlling engine combustion according to an exemplary embodiment of the present invention.

FIG. 6 is a view sequentially illustrating the method for controlling engine combustion by a controller according to an exemplary embodiment of the present invention. Referring to FIG. 6, the method for controlling engine combustion according to an exemplary embodiment of the present invention is sequentially described, and the detail description on the specific item which was previously described will be omitted.

First, the signal of the crank position sensor is read (S11) and a signal conditioning process is performed (S12).

Furthermore, only the data of a zone (TDC~TDC+60CA) having a crank angle 60° with respect to a top dead center (TDC; firing) of each cylinder is trimmed (S13) to determine the angular velocity and angular acceleration of the crank only in the zone where combustion occurs.

The combustion characteristic index for N cylinders per cycle is determined from the angular velocity and angular acceleration of the crank determined through the above step and is then stored (S14).

Furthermore, the standard deviation for the median of the combustion characteristic index of one cycle is determined (S15).

As such, the target values (revolutions per minute, load) are set differently according to the control purpose (the control of irregular vibration or the control of the deviation between the cylinders) (S16), and the standard deviation for median of the combustion characteristic index is compared with a predetermined threshold value (S17).

As a result of comparison, if the standard deviation is equal to or greater than the threshold value, it is determined that the $n^{th}$ cylinder in which min (CCI (n)) is the minimum is the unstable combustion cylinder (S18).

A combustion factor (ignition timing or fuel amount) for improving instability of the control-targeted cylinder judged in the step S18 are changed according to the control purpose (S19).

The present invention can more accurately determine the occurrence of irregular vibration as compared with the conventional method, and can reduce irregular vibration and the deviation between the cylinders by correcting and controlling the combustion unstable cylinder.

Figure 7:
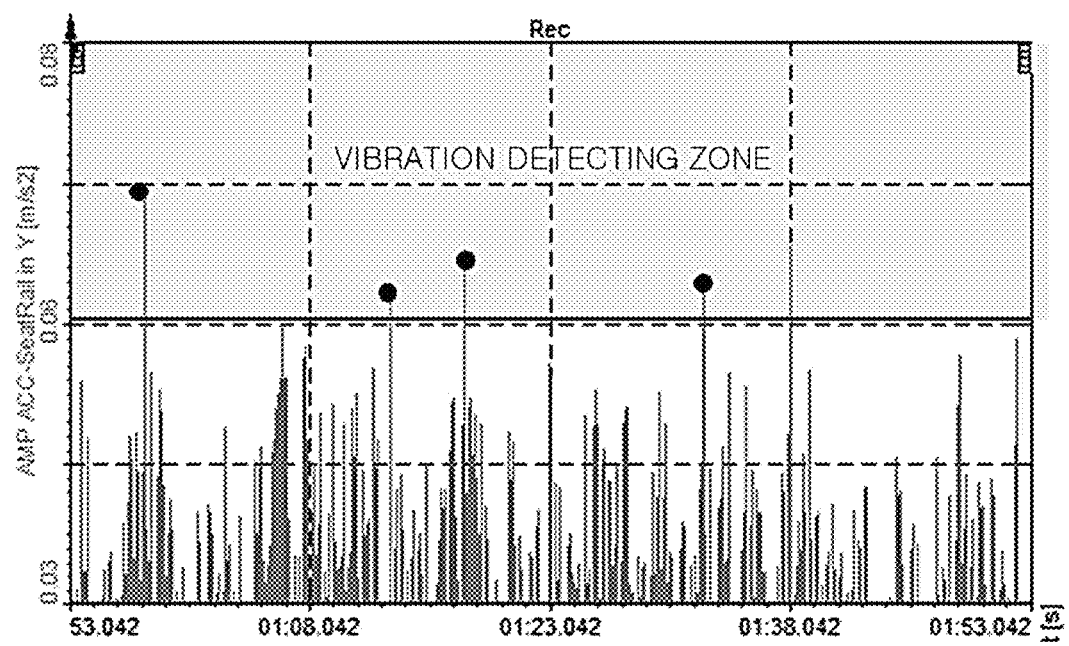
FIG. 7 and FIG. 8 are views illustrating whether irregular vibration is detected according to whether the combustion characteristic index of the present invention is utilized.
Figure 8:
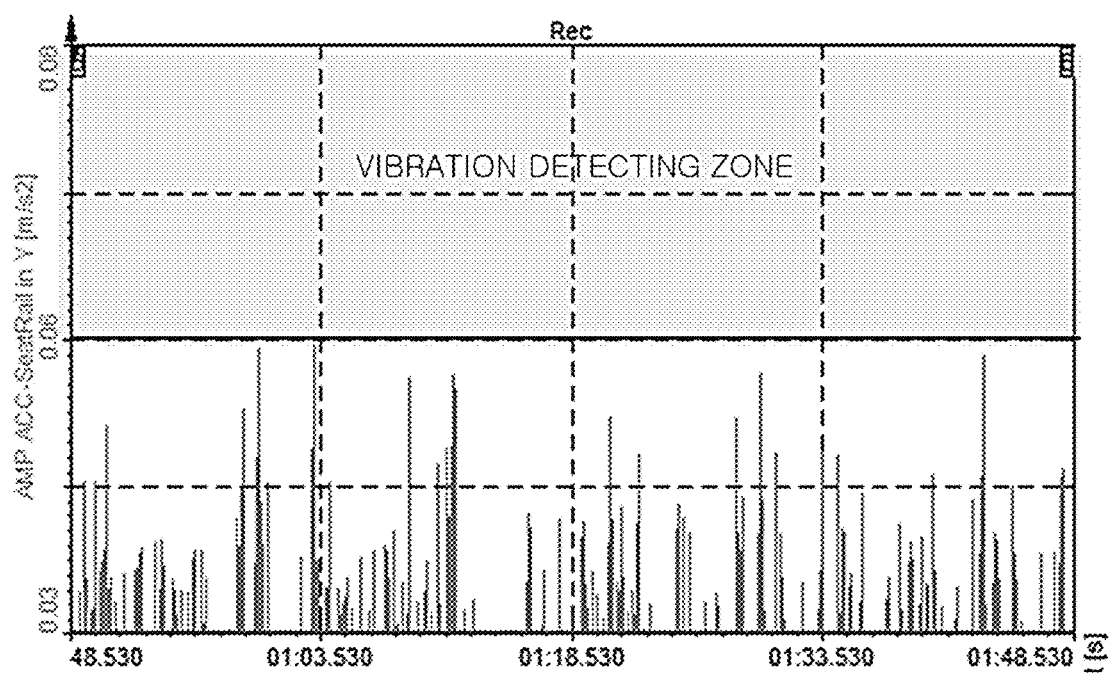

In other words, FIG. 7 shows vibration in a conventional case where the present invention is not applied, and FIG. 8 shows vibration in the case where the present invention is applied. In the case shown in FIG. 7, the detection rate of vibration exceeding the standard is 41.9%, whereas in the case of FIG. 8 where the present invention is applied, the detection rate of vibration exceeding the standard is 71.4%, and consequently irregular vibration may be more accurately detected by applying the present invention.

On the other hand, in a case of feedbacking and controlling a seat vibration signal, there is a risk that seat vibration occurs irrespective of engine combustion and causes an error. However, the combustion characteristic index of the present invention is obtained by determining the velocity of the engine crank caused by engine combustion and the engine is controlled on the basis of the combustion characteristic index, and thus it is possible to more accurately control irregular vibration.

According to the method for controlling engine combustion according to an exemplary embodiment of the present invention, by confirming the correlation between irregular vibration and the combustion stability of the vehicle, the occurrence of irregular vibration is detected to improve the combustion stability. Therefore, it is possible to reduce irregular vibration of the vehicle.

In comparison with the related art, therefore, noise, vibration, harshness (NVH) performance of the vehicle may be improved by improving the deviation between the cylinders.

Furthermore, by use of the median without using the commonly used mean value, the influence on the problematic cylinder may be excluded from the cylinder detection, so that it is possible to more sensitively detect the problematic cylinder.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling engine combustion, the method comprising:
   receiving, by a controller, a signal of a crank position sensor;
   determining, by the controller, an angular velocity and an angular acceleration of a crank on a basis of the signal of the crank position sensor;
   determining, by the controller, a combustion characteristic index for each cylinder of an engine using the angular velocity and the angular acceleration of the crank;
   judging, by the controller, an unstable combustion cylinder using the combustion characteristic index for each cylinder; and
   changing a combustion factor for controlling the unstable combustion cylinder,
   wherein the combustion characteristic index(CCI) is determined by the follow equation.

$$CCI = \frac{\int \alpha d\theta}{(\overline{\omega})^2} = \frac{\text{Integral of } CA \text{ reference of angular acceleration in combustion zone } \left[\frac{rad^2}{sec^2}\right]}{\text{Square of average angular velocity in combustion zone } \left[\frac{rad^2}{sec^2}\right]}.$$

2. The method for controlling the engine combustion of claim 1,
   wherein, in determining the angular velocity and the angular acceleration of the crank, the angular velocity and the angular acceleration of the crank are determined using a crank signal for a time between when a crank position is at a top dead center (TDC) of a cylinder and when the crank position is at a crank angle (CA) 60° with respect to the TDC of the crank signal received in receiving the signal of the crank position sensor.

3. The method for controlling the engine combustion of claim 1, further including:
   determining a standard deviation for a median of the combustion characteristic index for each cylinder.

4. The method for controlling the engine combustion of claim 3,
   wherein the standard deviation for the median is determined by the below equation, $$\text{Deviation of Median} = \sqrt{\frac{1}{N}\sum_{i=1}^{4}(CCI._{cyli} - \text{median}(n.i._{cyli}))^2},$$

wherein N is the number of cylinders, CCI.cyli is combustion characteristic index of $i^{th}$ cylinder out of the N cylinders.

5. The method for controlling the engine combustion of claim 4, further including:
   judging, by the controller, when the standard deviation for the median is equal to or greater than a predetermined threshold value; and
   determining, by the controller, a cylinder having the combustion characteristic index as the unstable combustion cylinder when the standard deviation for the median is equal to or greater than the predetermined threshold value.

6. The method for controlling the engine combustion of claim 5,
   wherein, in changing the combustion factor for controlling the unstable combustion cylinder, ignition timing or fuel amount of the unstable combustion cylinder is controlled and changed.

* * * * *